(12) United States Patent
Laymon

(10) Patent No.: US 8,637,788 B2
(45) Date of Patent: Jan. 28, 2014

(54) FLEXIBLE CONDUCTOR TUBE FOR A WELDING GUN

(75) Inventor: Patrick A. Laymon, Denton, TX (US)

(73) Assignee: Victor Equipment Company, Chesterfield, MO (US)

( * ) Notice: Subject to any disclaimer, the term of this patent is extended or adjusted under 35 U.S.C. 154(b) by 1349 days.

(21) Appl. No.: 11/761,159

(22) Filed: Jun. 11, 2007

(65) Prior Publication Data

US 2007/0284354 A1     Dec. 13, 2007

Related U.S. Application Data

(60) Provisional application No. 60/812,415, filed on Jun. 9, 2006.

(51) Int. Cl.
*B23K 9/28* (2006.01)
*B23K 9/29* (2006.01)
*B23K 9/18* (2006.01)

(52) U.S. Cl.
CPC ............... *B23K 9/291* (2013.01); *B23K 9/295* (2013.01); *B23K 9/186* (2013.01)
USPC ............... 219/137.51; 219/137.31; 239/587.2

(58) Field of Classification Search
USPC ............ 219/137.31, 137.41, 137.42, 137.43, 219/137.44, 137.51, 137.52, 137.61, 219/137.62, 137.63, 137.8, 138; 238/587.1–587.4
See application file for complete search history.

(56) References Cited

U.S. PATENT DOCUMENTS

| | | | |
|---|---|---|---|
| 395,671 A * | 1/1889 | Thayer | 285/262 |
| 809,977 A * | 1/1906 | O'Brien | 138/120 |
| 2,342,757 A * | 2/1944 | Roser | 239/536 |
| 3,249,734 A * | 5/1966 | Meyer | 219/137.61 |
| 3,707,616 A * | 12/1972 | Lindkvist | 219/136 |
| 4,145,595 A | 3/1979 | Keller et al. | |
| 4,268,740 A | 5/1981 | Sanders | |
| 4,401,878 A * | 8/1983 | Roen | 219/137.31 |

(Continued)

FOREIGN PATENT DOCUMENTS

DE     3909839 A * 10/1989
DE     19910128 C1 * 1/2001

(Continued)

OTHER PUBLICATIONS

Loc-Line® Modular hose. Newman tools inc. updated Feb. 2002(accessed on Dec. 12, 2007); Retrieved from the internet: <url: http://www.newmantools.com/locline/index.html.

*Primary Examiner* — Henry Yuen
*Assistant Examiner* — Thien S Tran
(74) *Attorney, Agent, or Firm* — Brinks Gilson & Lione

(57) ABSTRACT

A conductor tube for use in a welding gun, and preferably a MIG welding gun, is provided that includes a plurality of flex joints. The flex joints include a body defining a proximal end portion and a distal end portion, a cap secured to the proximal end portion of the body, and an extension mounted within the distal end portion of the body, the extension being repositionable within the body. The body, the extension, and the cap are adapted for attachment to each other and to adjacent components of the welding gun. Additionally, a conductor tube for use in a welding gun includes a plurality of thermally and electrically conductive elements secured to each other and extending along a length of the conductor tube, wherein the elements are independently repositionable relative to each other.

25 Claims, 18 Drawing Sheets

(56) References Cited

U.S. PATENT DOCUMENTS

| | | |
|---|---|---|
| 4,613,250 A | 9/1986 | Laucus |
| 5,215,338 A | 6/1993 | Kimura et al. |
| 5,338,917 A | 8/1994 | Stuart et al. |
| 5,440,100 A | 8/1995 | Stuart et al. |
| 5,491,321 A | 2/1996 | Stuart et al. |
| 5,916,465 A | 6/1999 | New et al. |
| 5,965,045 A * | 10/1999 | Zigliotto .................. 219/137.31 |
| 6,419,417 B1 | 7/2002 | Zigliotto |
| 2004/0156691 A1 * | 8/2004 | Inuzuka ........................ 409/234 |
| 2006/0041270 A1 | 2/2006 | Lenker |
| 2007/0181114 A1 * | 8/2007 | Tippmann et al. .............. 124/71 |

FOREIGN PATENT DOCUMENTS

| | | | |
|---|---|---|---|
| EP | 0 875 708 A1 | | 11/1998 |
| JP | 56009073 A | * | 1/1981 |
| JP | 08 267249 A | | 10/1996 |

* cited by examiner

FLEXIBLE CONDUCTOR TUBE FOR A WELDING GUN

CROSS-REFERENCE TO RELATED APPLICATIONS

This application claims the benefit of U.S. Provisional Application No. 60/812,415, filed on Jun. 9, 2006. The disclosure of the above provisional application is incorporated herein by reference in its entirety.

FIELD

The present disclosure relates generally to welding guns, and more particularly to improved conductor tubes for use in welding guns such as MIG (Metal Inert Gas) welding guns.

BACKGROUND

The statements in this section merely provide background information related to the present disclosure and may not constitute prior art.

In a typical welding gun, and more specifically a MIG welding gun, a conductor tube is secured to the end of a welding gun handle and generally functions to conduct gas and provide a conduit for feeding welding wire from a supply device (e.g., wire feeder) to the end of the conductor tube. The welding wire is fed through an assembly of consumable components that are secured to the end of the conductor tube, including a diffuser, a contact tip, and a nozzle. Generally, the diffuser distributes a shield gas within the nozzle and around the welding wire to provide a shielded weld zone, the contact tip guides the welding wire through to the weld zone and also conducts current to the welding wire, and the nozzle houses the consumable components, delivers the shielding gas, and shields the other consumable components from weld spatter. Operation of a typical MIG welding gun, by way of example, is shown and described in U.S. Pat. Nos. 5,491,321 and 5,338,917, which are commonly owned with the present application, and the contents of which are incorporated herein by reference in their entirety.

Conductor tubes are generally provided in a variety of shapes and sizes depending on the welding operation/environment. For example, most conductor tubes are angled, or define a bend, and others define a generally straight shape. Depending on the welding environment, an operator often needs to adjust the length or the angle of the conductor tube. One way of achieving this adjustment is to physically remove the conductor tube, which is most often secured to a welding gun handle with an Allen screw, and replace it with another conductor tube having the desired length and/or bend angle. To reduce this frequency of changing the conductor tube, and thus overall downtime, some known welding guns provide a flexible conductor tube by winding a number of copper wires around a cable assembly. However, these flexible conductors present certain drawbacks. First of all, the copper wires cannot withstand repeated flexing over an extended period of time and often deform or break only after a few days of operation. Secondly, the unlimited degrees of freedom of rotation provided by the copper wires often causes wire feed problems inside the conductor tube when the tube is repeatedly flexed, especially at extreme angles, over an extended period of time.

During use, weld splatter often accumulates onto the exterior surface of the nozzle and a typical operator will tap or hit the end of the nozzle against a hard surface to knock off the splatter if the accumulation begins to affect the quality of the weld. As such, the conductor tube, and often the consumable components, undergo premature failure, and wire feed problems can occur from knocking off the splatter in this manner. Additionally, the position of the conductor tube is often changed when the end of the nozzle is tapped or hit against the hard surface, which causes the operator to interrupt a welding operation to reposition the conductor tube, thus contributing to increased downtime.

SUMMARY

In one form, a conductor tube for use in a welding gun is provided that comprises a plurality of flex joints disposed adjacent one another and adapted for placement between a welding gun handle element and a diffuser element. Each of the flex joints comprises a body defining a proximal end portion and a distal end portion, an extension rotatably secured within the distal end portion of the body, the extension defining a head portion, a cup disposed proximate the extension, the cup defining a concave inner surface adapted for engagement with the head portion of the extension, at least one spring element disposed around at least a portion of the cup, and a cap releasably secured to the proximal end portion of the body and adapted for engagement with the spring element. The extension is adapted for attachment to the cap of an adjacent flex joint and to the diffuser element, and the body is adapted for attachment to the welding gun handle element and to the cap.

In another form, a conductor tube for use in a welding gun comprising at least one flex joint is provided. The flex joint comprises a body defining a proximal end portion and a distal end portion, a cap secured to the proximal end portion of the body, and an extension mounted within the distal end portion of the body. The extension is repositionable within the body, and the body, the extension, and the cap are adapted for attachment to each other and to adjacent components of the welding gun.

In yet another form, a flex joint is provided that comprises a body defining a proximal end portion and a distal end portion, and an extension rotatably secured within the distal end portion of the body, wherein the extension defines a head portion. A cup is also provided proximate the extension, the cup defining a concave inner surface adapted for engagement with the head portion of the extension. The flex joint further comprises at least one spring element disposed around at least a portion of the cup, and a cap releasably secured to the proximal end portion of the body and adapted for engagement with the spring element.

Additionally, a conductor tube for use in a welding gun is provided that comprises a plurality of thermally and electrically conductive elements secured to each other and extending along a length of the conductor tube, wherein the elements are independently repositionable relative to each other.

In still another form, a welding gun is provided that comprises a handle and a conductor tube secured to the handle. The conductor tube comprises a plurality of thermally and electrically conductive elements secured to each other and extending along a length of the conductor tube, wherein the elements are independently repositionable relative to each other. Additionally, and a set of consumables is secured to a distal end of the conductor tube.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 17:
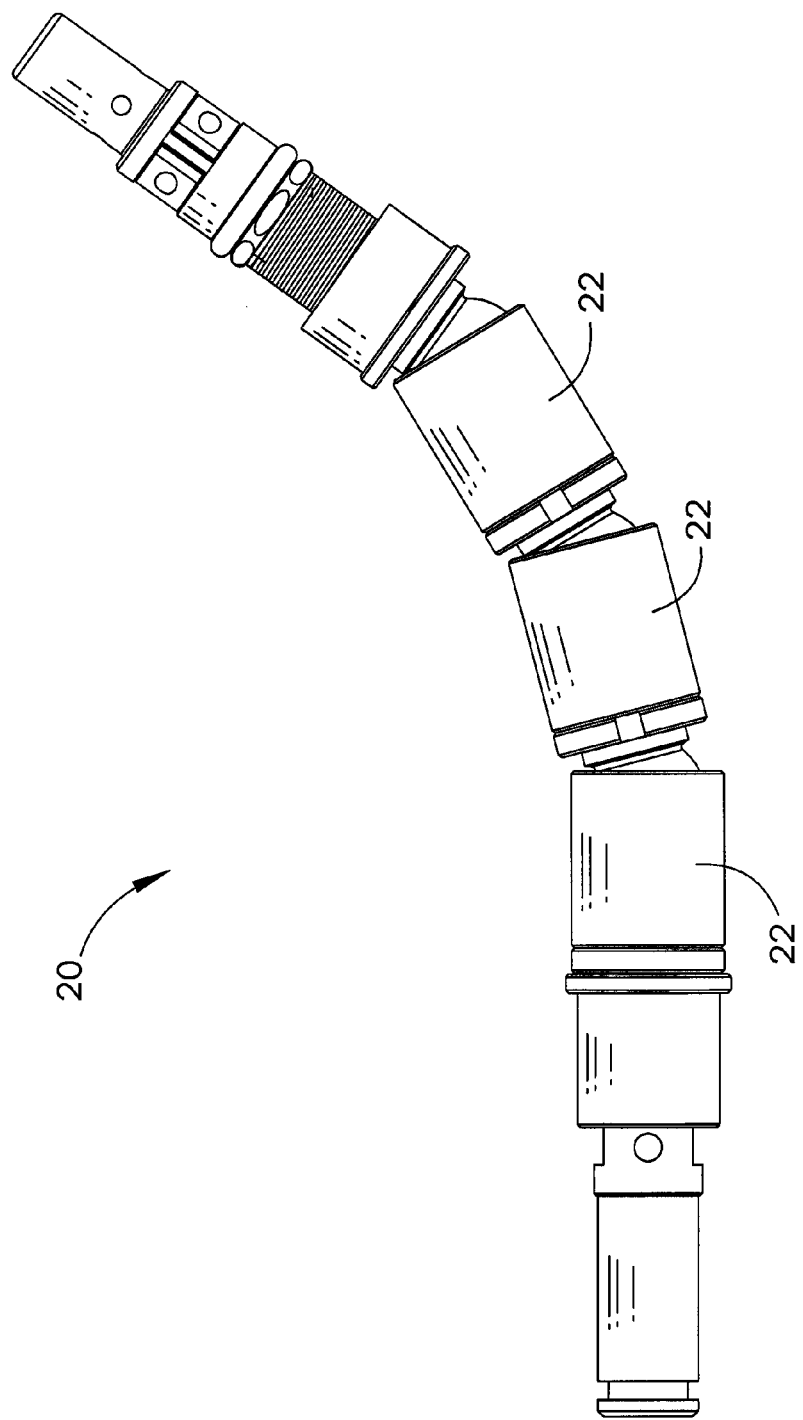
Figure 18:
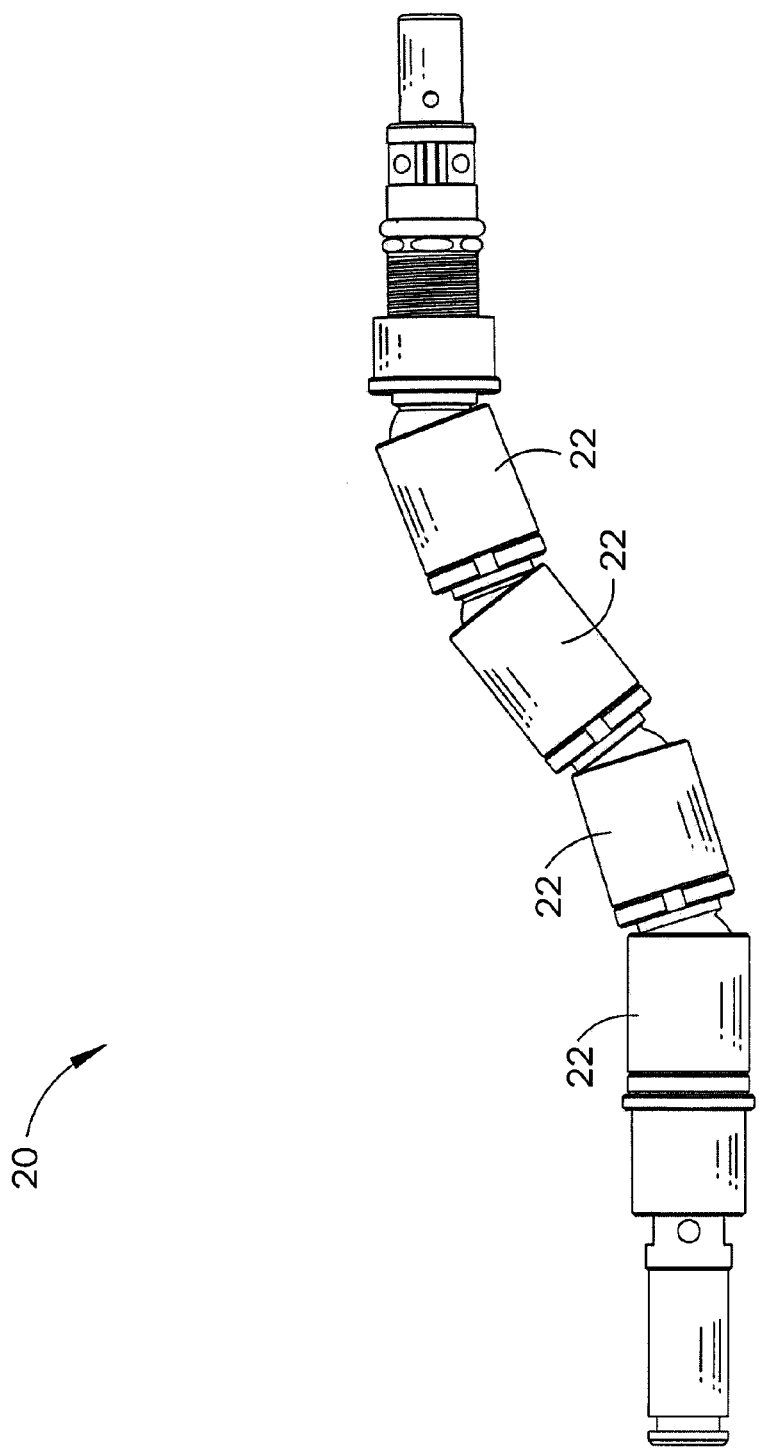

FIG. 17 is a side view of the flexible conductor tube with three (3) flex joints rotated up to change the position or bend of the flexible conductor tube in accordance with the teachings of the present disclosure; and FIG. 18 is a side view of the flexible conductor tube with the flex joints bending in multiple directions along the length of the conductor tube, the flex joints being rotated relative to one another to define an overall shape that is not a constant curve, in accordance with the teachings of the present disclose.

DETAILED DESCRIPTION

The following description is merely exemplary in nature and is not intended to limit the present disclosure, application, or uses.

Figure 1:
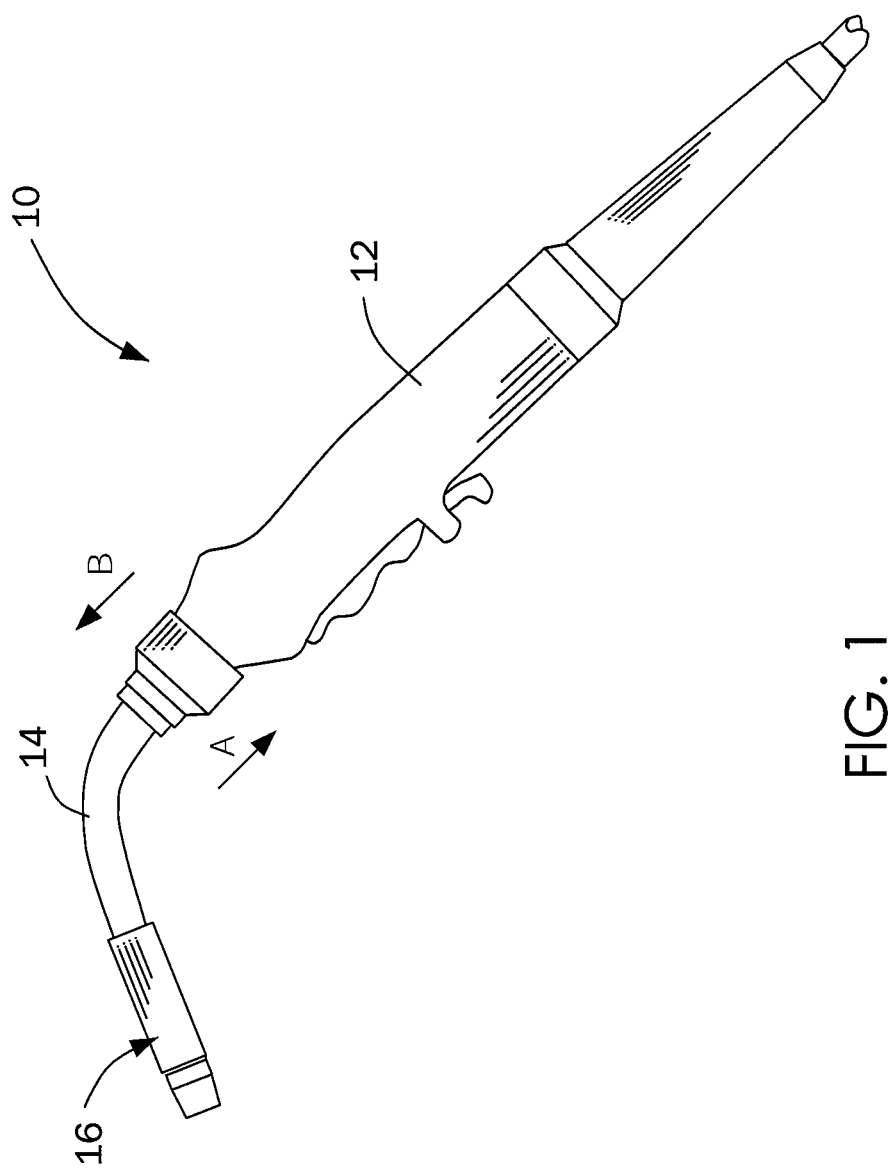
FIG. 1 is a side view of a MIG welding torch in accordance with the teachings of the present disclosure.

Referring to FIG. 1, a MIG welding gun is illustrated and generally indicated by reference numeral 10. The MIG welding gun 10 comprises a welding gun handle 12, a conductor tube 14 secured to the welding gun handle 12, and a set of consumables 16 secured a distal end of the conductor tube 14. The set of consumables 16 generally include a nozzle, a diffuser, and a contact tip (not shown in FIG. 1), the exemplary operation of which are described in greater detail in U.S. Pat. Nos. 5,491,321 and 5,338,917, which are commonly owned with the present application, and the contents of which are incorporated herein by reference in their entirety.

Figure 2:
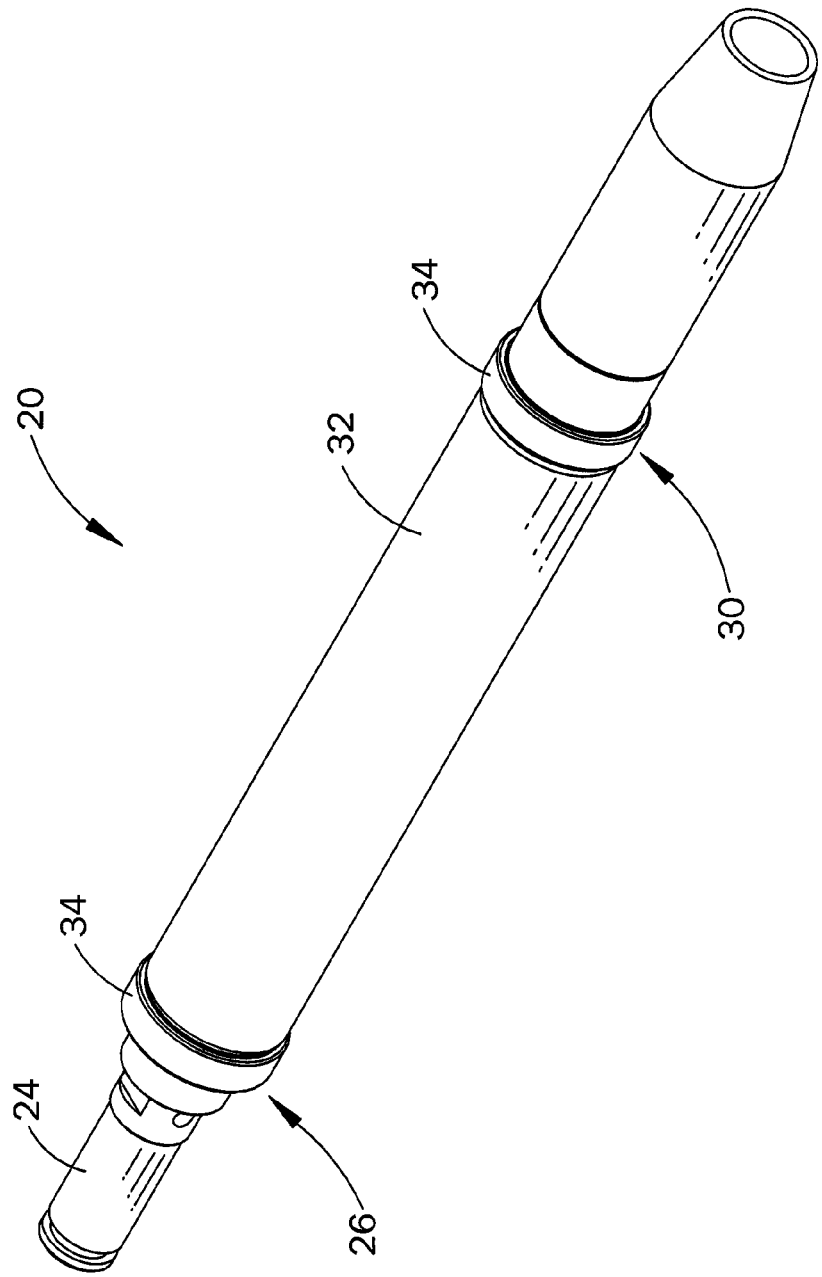
FIG. 2 is a perspective view of a flexible conductor tube constructed in accordance with the teachings of the present disclosure.
Figure 3:
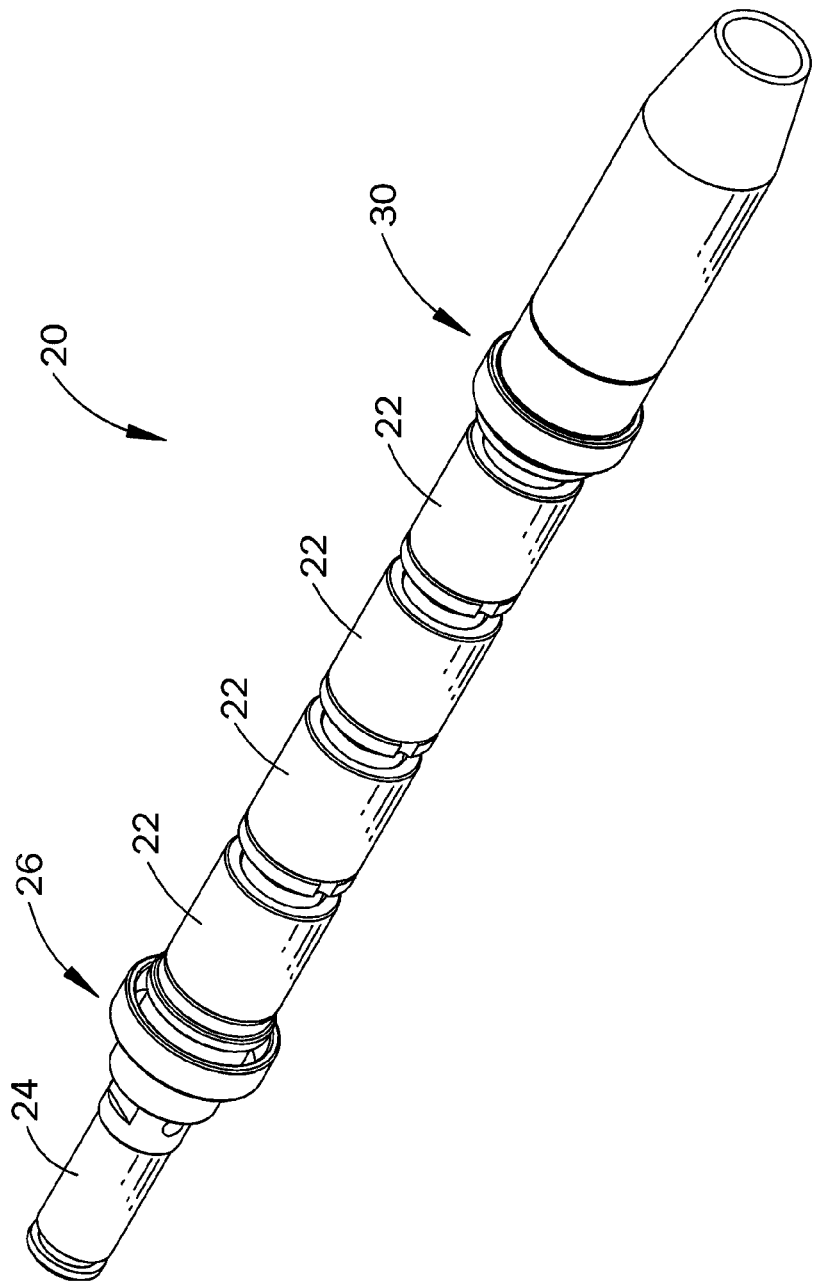
FIG. 3 is a perspective view of the flexible conductor tube illustrating a plurality of flex joints constructed in accordance with the teachings of the present disclosure.
Figure 4:
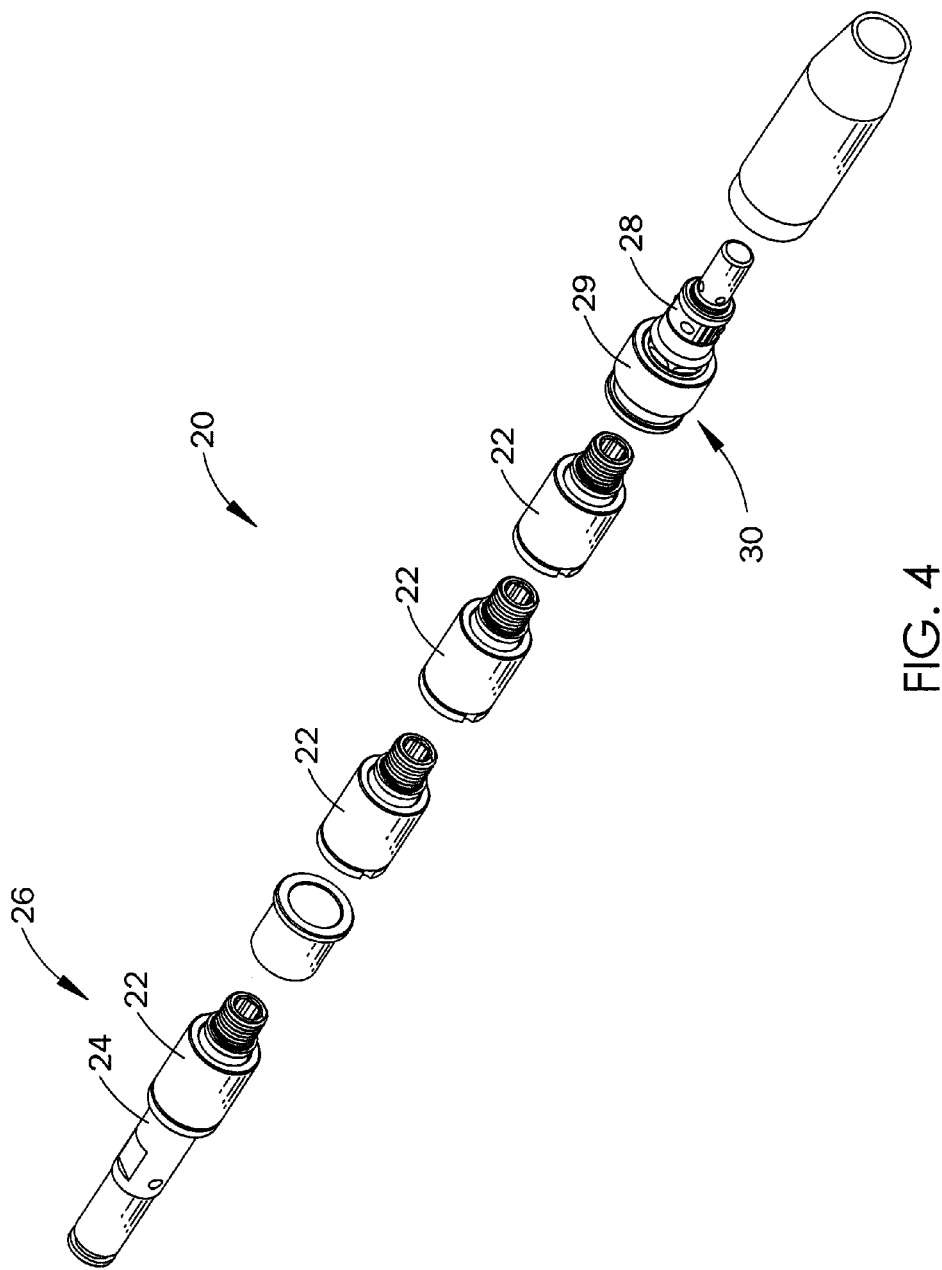
FIG. 4 is an exploded perspective view of the flexible conductor tube in accordance with the teachings of the present disclosure.
Figure 5:
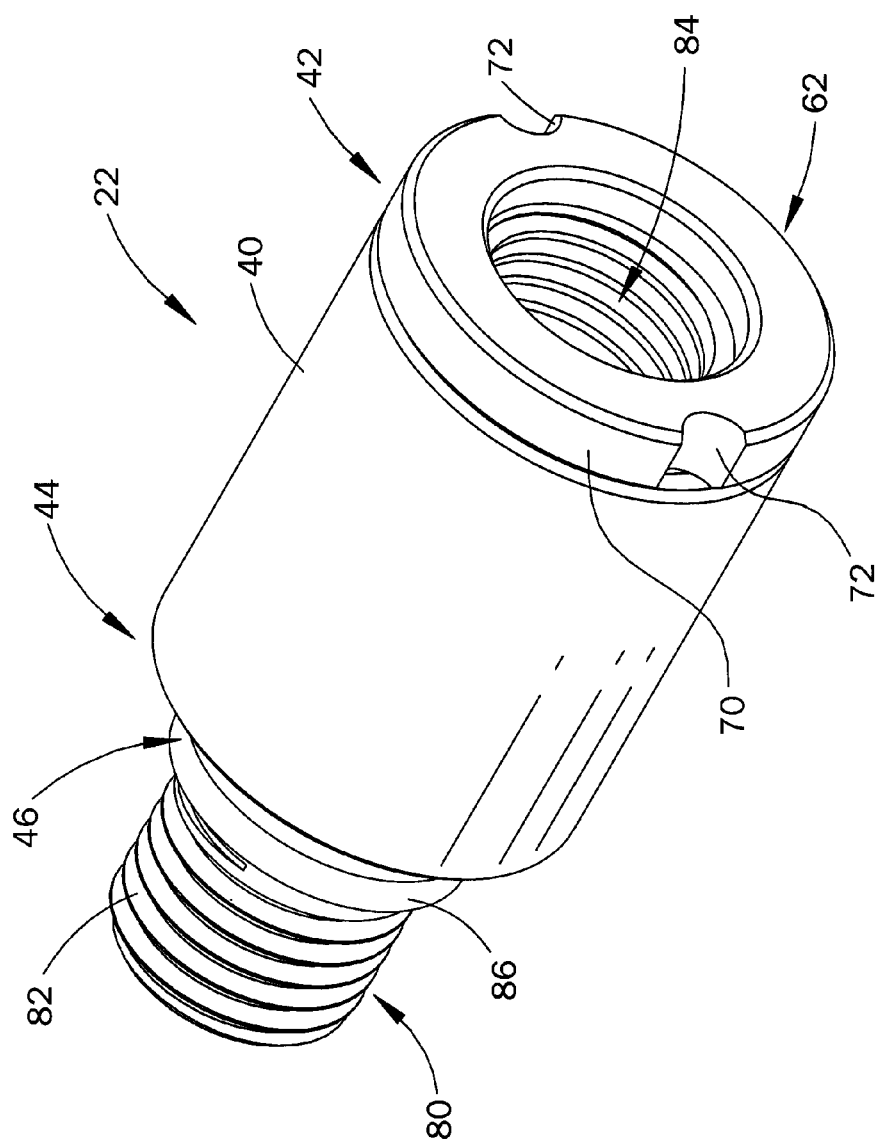
FIG. 5 is a perspective view of a flex joint constructed in accordance with the teachings of the present disclosure.
Figure 6:
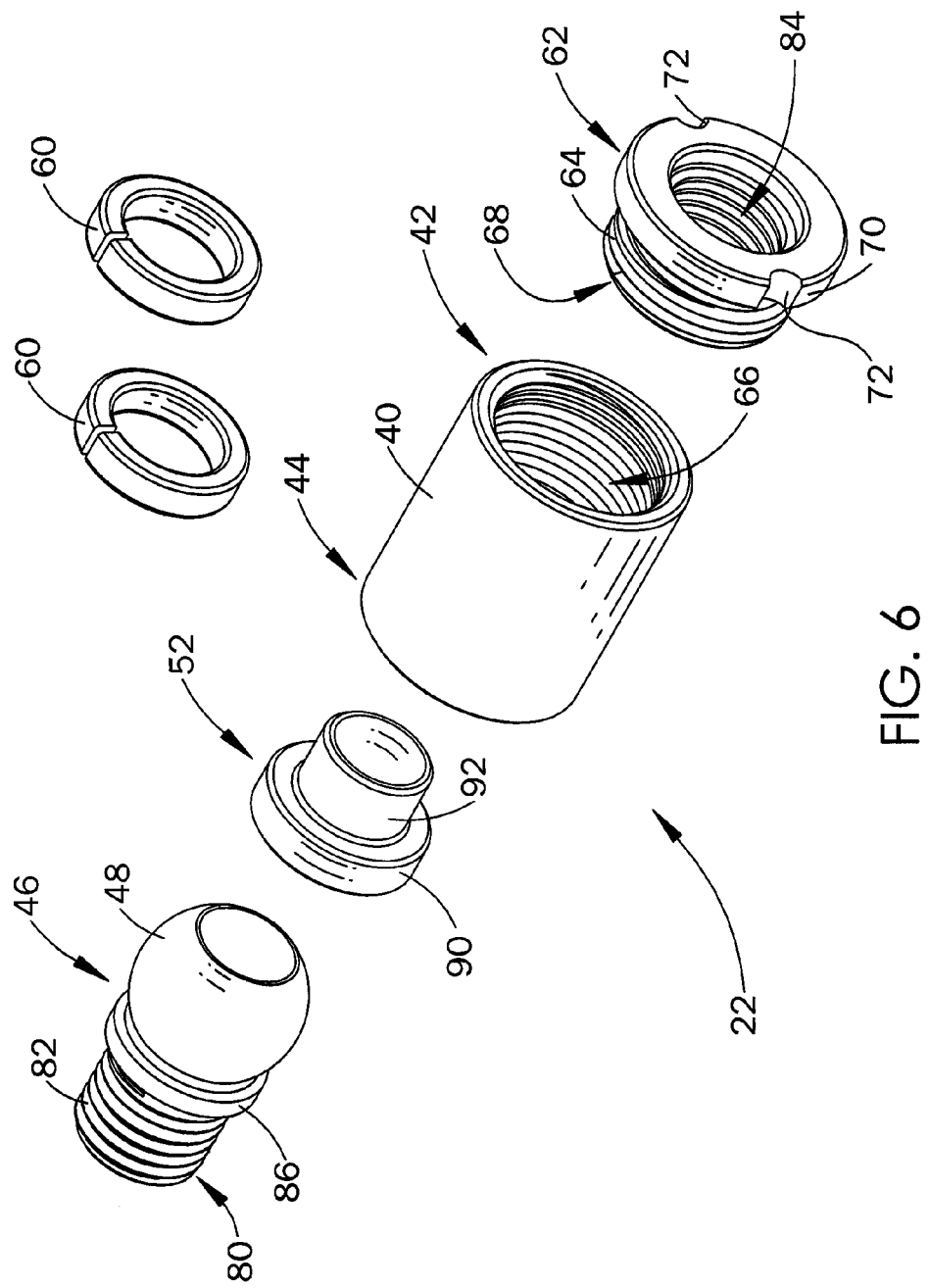
FIG. 6 is an exploded perspective view of the flex joint in accordance with the teachings of the present disclosure.
Figure 7:
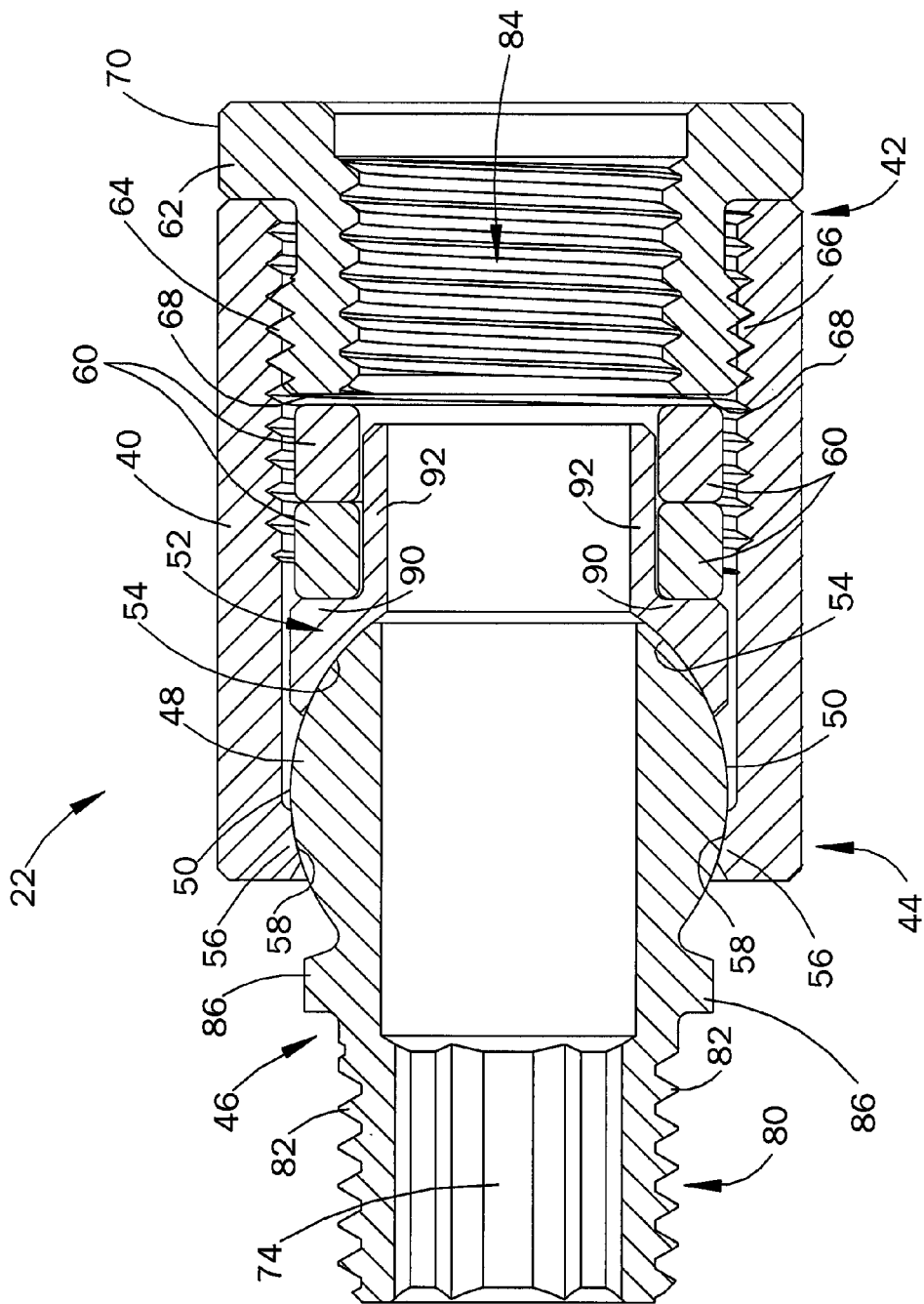
FIG. 7 is a cross-sectional view of the flex joint in accordance with the teachings of the present disclosure.
Figure 8:
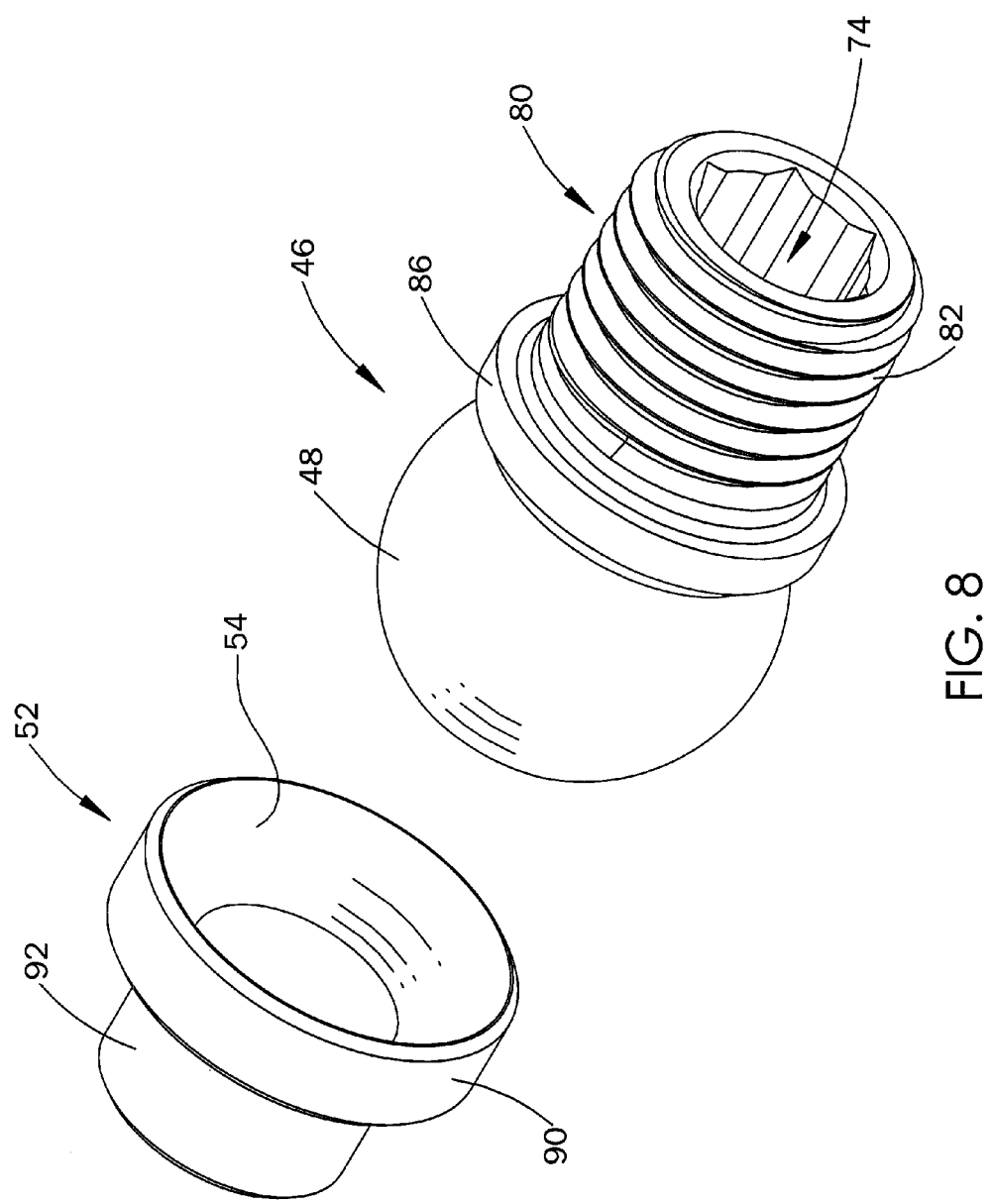
FIG. 8 is a perspective view an extension and a cup of the flex joint constructed in accordance with the teachings of the present disclosure.

Referring now to FIGS. 2-4, a conductor tube in accordance with the teachings of the present disclosure and for use in a welding gun, such as a MIG welding gun by way of example, is illustrated and generally indicated by reference numeral 20. The conductor tube 20 comprises a plurality of flex joints 22, four (4) of which are illustrated in these figures. It should be understood, however, that any number and/or size of flex joints 22 may be employed while remaining within the scope of the present disclosure, and as such, the four (4) flex joints 22 as illustrated and described herein are merely exemplary. Generally, the flex joints 22 are secured to one another and also to adjacent components of the welding gun (not shown) such as an adapter 24 at a proximal end portion 26, and a diffuser end element 29 at a distal end portion 30. As used herein, the term "proximal" should be understood to mean in a direction towards the welding gun handle 12 as shown by arrow A in FIG. 1, and the term "distal" should be understood to mean in a direction away from the welding gun handle, or towards the consumables 16, as shown by arrow B in FIG. 1.

A diffuser 28 is secured to the diffuser end element 29, and the diffuser end element 29 is adapted for attachment to an adjacent flex joint 22 as shown. As such, the diffuser end element 29 can be designed to receive a number of different styles of diffusers 28 at one end while being adapted for attachment to the flex joints 22 at its other end. Therefore, any number of different styles of diffusers 28 from a variety of manufacturers can be employed with the flex joints 22 of the conductor tube 20 in accordance with the teachings of the present disclosure. Similarly, the adapter 24 is adapted for attachment to an adjacent flex joint 22 at one end, while being adapted for attachment to a welding gun handle 12 at its other end. Accordingly, the adapter 24 can be designed to connect to a number of different styles of welding gun handles 12 such that welding gun handles 12 from a variety of manufacturers can be employed with the flex joints 22 of the conductor tube 20 in accordance with the teachings of the present disclosure. As a result, the innovative conductor tube 20 with its flex joints 22 can be employed with any number of different styles of welding torches from a variety of manufacturers, and as such, is retrofittable with existing welding guns.

The plurality of flex joints 22 are covered by a jacket 32 (FIG. 2), which is preferably secured to adjacent components of the welding gun by collars 34 that are preferably crimped around the jacket 32. Preferably, the jacket 32 comprises a Neoprene material, however, it should be understood that other materials may be employed while remaining within the scope of the present disclosure. Generally, the material for the jacket 32 should be flexible and durable to accommodate the repeated movement of the flex joints 22 as described in greater detail below.

Referring now to FIGS. 5-8, the flex joints 22 comprise a body 40 defining a proximal end portion 42 and a distal end portion 44, and an extension 46 rotatably secured within the distal end portion 44 of the body 40. To provide rotation, the extension 46 defines a head portion 48 having an outer surface 50 that is adapted for engagement with a cup 52 and the body 40. More specifically, the cup 52 is disposed proximate the extension 46 and defines a concave inner surface 54 that the head portion 48 engages and rotates along. As further shown, the body 40 also comprises an internal lip 56 that defines a contoured surface 58 adapted for engagement with the head portion 48 of the extension 46, similar to the concave inner surface 54 of the cup 52. When the extension 46 is secured within the body 40, the outer surface 50 of the head portion 48 engages and is thus able to rotate along the contoured surface 58 of the body 40 and also the concave inner surface 54 of the cup 52.

The flex joint 22 further comprises at least one spring element 60, and preferably two (2) as illustrated as described herein, which are preferably high collar spring washers and are disposed around a portion of the cup 52, inside the body 40. A cap 62 is releasably secured to the proximal end portion 42 of the body 40 and is adapted for engagement with the spring elements 60 to secure the extension 46 within the body 40. In this regard, the cap 62 preferably comprises external threads 64 that engage corresponding internal threads 66 of the body 40. The cap 62 also comprises a distal face 68 that is adapted for engagement with the spring elements 60. As the cap 62 is threaded into the body 40, the distal face 68 engages the spring elements 60, which then apply a force to the cup 52, thereby securing the extension 46 within the body 40. Additionally, the cap 62 comprises an annular flange 70 that is adapted to abut the body 40, thus limiting longitudinal travel of the cap 62 and the force that can be applied to secure the extension 46 within the body 40. The cap 62 also preferably comprises radially opposed recesses 72 disposed along the annular flange 70 that are adapted to receive a tool and thus facilitate tightening the cap 62 to the body 40. Additionally, the extension 46 preferably defines a keyed internal bore 74, also for receiving a tool such as an Allen wrench by way of example, to facilitate tightening the flex joint 22 itself and also adjacent flex joints 22 to each other.

The extension 46 also comprises a distal projection 80, which is adapted for attachment to the cap 62 of an adjacent flex joint 22 and to the diffuser end element 29 (FIG. 4). The distal projection 80 preferably defines external threads 82 that are adapted for engagement with corresponding internal threads 84 of the cap 62 of an adjacent flex joint 22. The extension 46 also comprises a collar 86 disposed between the head portion 48 and the distal projection 80, wherein the collar 86 is adapted for engagement with the cap 62 of an adjacent flex joint 22. This engagement limits longitudinal travel of one flex joint 22 relative to an adjacent flex joint 22 and thus properly positions the flex joints 22 in the overall assembly of the conductor tube 20.

As further shown, the cup 52 comprises a collar 90 and a flange 92 extending from the collar 90. The spring elements 60 are disposed around the flange 92 to abut the collar 90, thus applying the force to secure the extension 46 within the body 40.

Preferable materials for the flex joint 22 include, by way of example, an aluminum material for the body 40, a copper material for the extension 46, a brass material for the cup 52, a steel material for the spring elements 60, and a brass material for the cap 62. As such, each of the components of the flex joint 22 that engage one another are preferably a different material to avoid issues with galling. The flex joints 22 are also thermally and electrically conductive for proper operation of the welding gun 10. Additionally, a lubricant is preferably applied to the outer surface 50 of the head portion 48, such as graphite by way of example, to provide easier rotation of the extension 46 and thus each of the flex joints 22 relative to one another.

Figure 9:
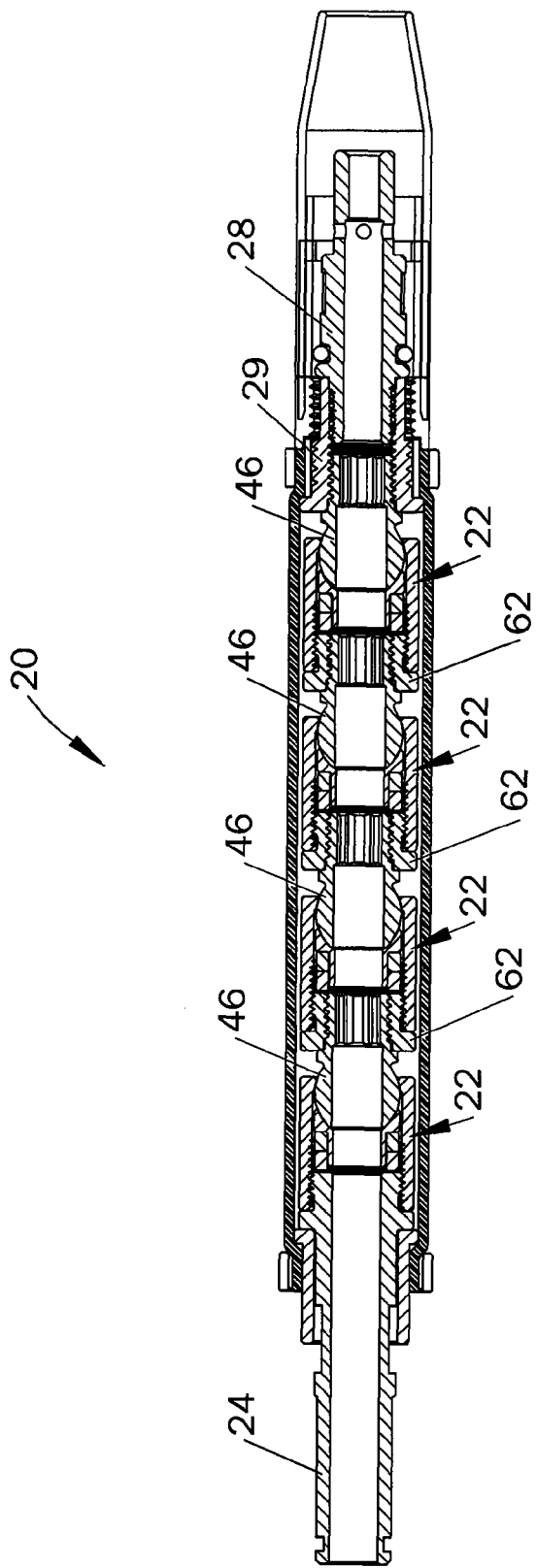
FIG. 9 is a cross-sectional view of the flexible conductor tube in accordance with the teachings of the present disclosure.
Figure 10:
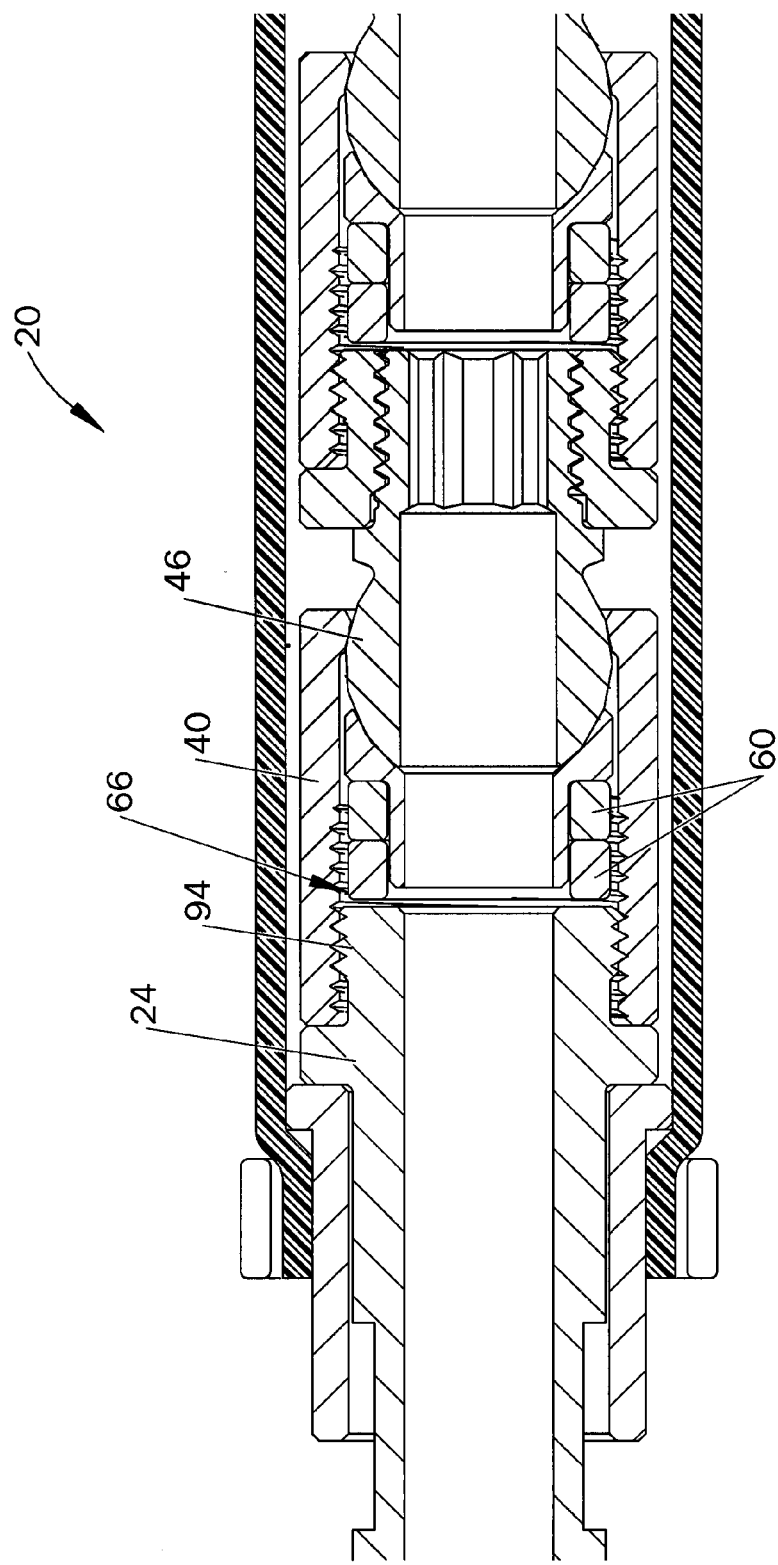
FIG. 10 is an enlarged cross-sectional view of the flexible conductor tube, illustrating a flex joint secured to an adjacent welding gun handle element in accordance with the teachings of the present disclosure.
Figure 11:
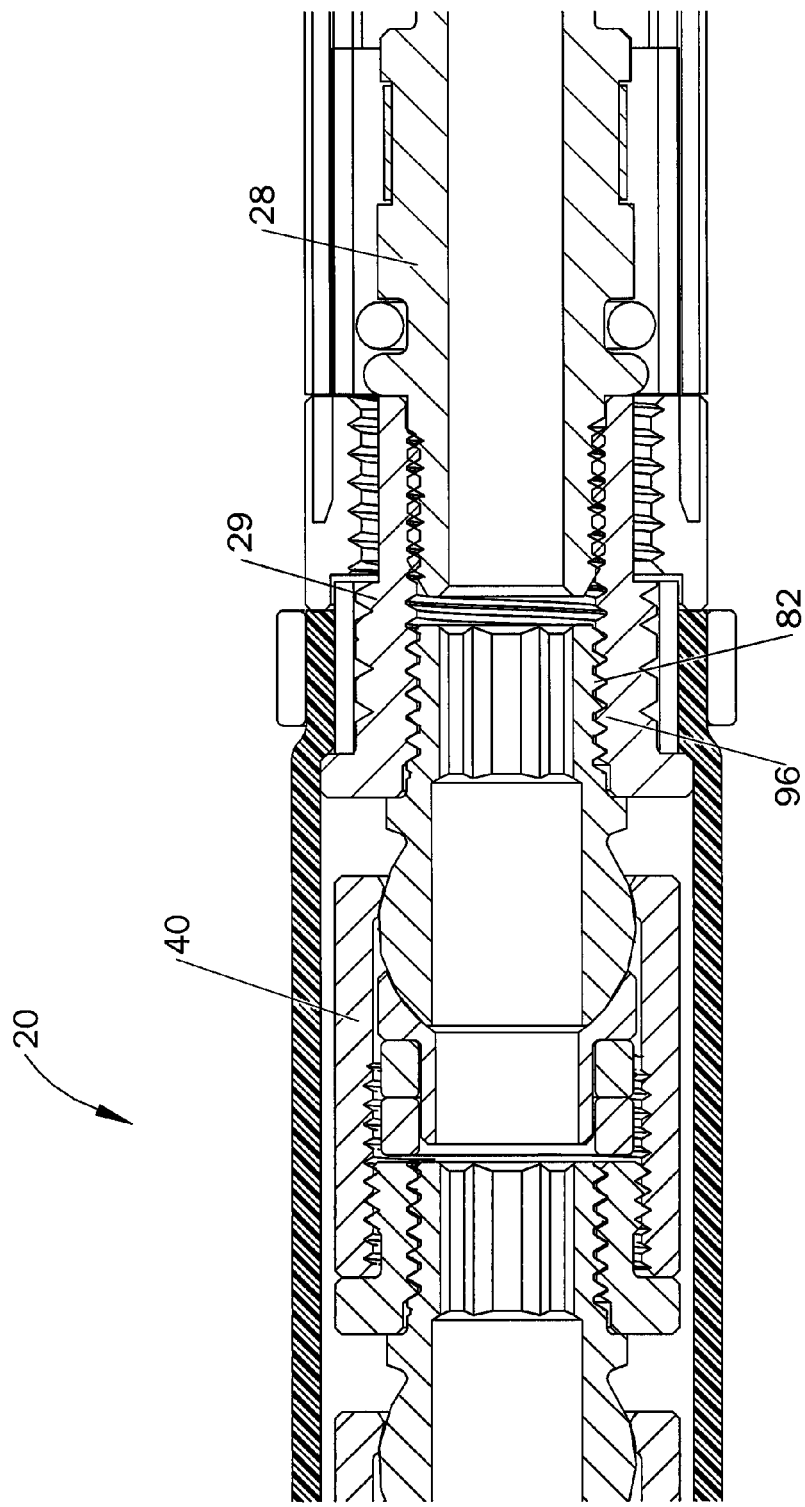
FIG. 11 is an enlarged cross-sectional view of the flexible conductor tube, illustrating a flex joint secured to an adjacent diffuser end element in accordance with the teachings of the present disclosure.
Figure 12:
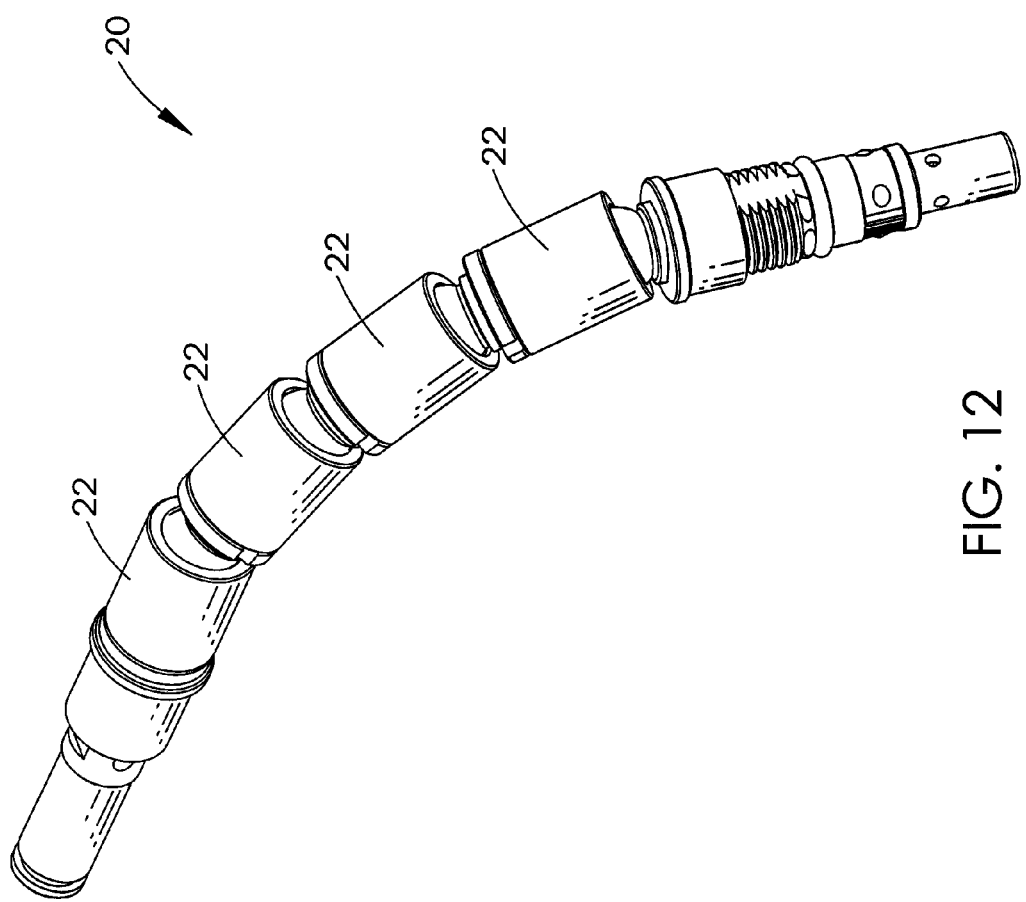
FIG. 12 is a perspective view of the flexible conductor tube with the flex joints rotated down to change the position or bend of the flexible conductor tube in accordance with the teachings of the present disclosure.

As shown in FIGS. 9-11, the flex joints 22 are joined to one another by the extensions 46 secured within the caps 62. Additionally, as shown in greater detail in FIGS. 10-11, the body 40 is adapted for attachment to an element of a welding gun handle such as the adapter 24, and the extension 46 is adapted for attachment to an adjacent welding gun component such as the diffuser end element 29. Accordingly, the internal threads 66 of the body 40 are engaged by corresponding external threads 94 of the adapter 24, and the external threads 82 of the extension 46 engage corresponding internal threads 96 of the diffuser end element 29. Additionally, the adapter 24 engages the spring elements 60 as shown in FIG. 10 to secure the extension 46 within the body 40. It should be understood that the threaded interfaces as illustrated and described herein are merely exemplary and that other types of mechanical connections, which also provide the requisite electrical connection, may also be employed while remaining within the scope of the present disclosure.

Figure 13:
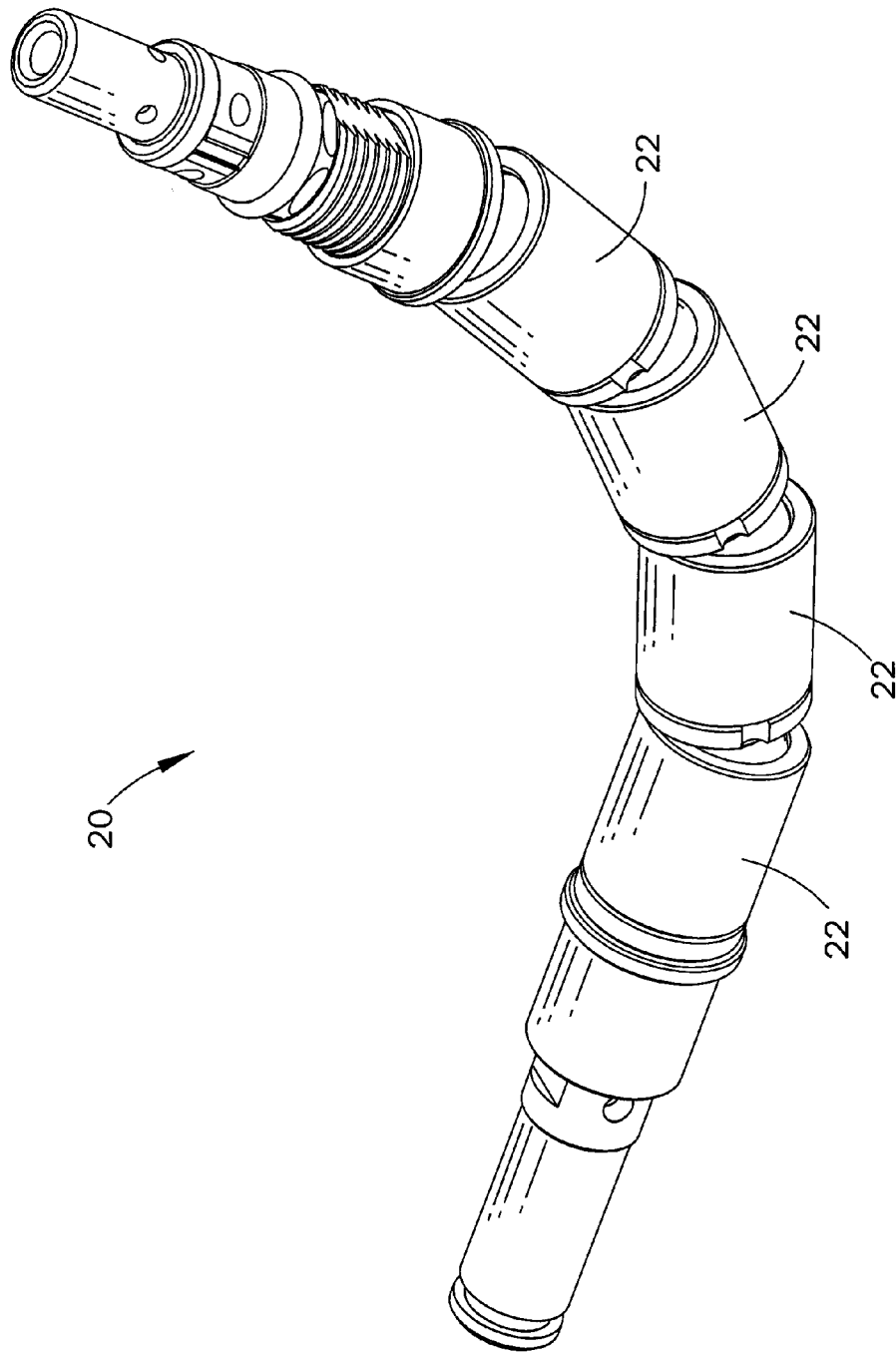
FIG. 13 is a perspective view of the flexible conductor tube with the flex joints rotated up to change the position or bend of the flexible conductor tube in accordance with the teachings of the present disclosure.
Figure 14:
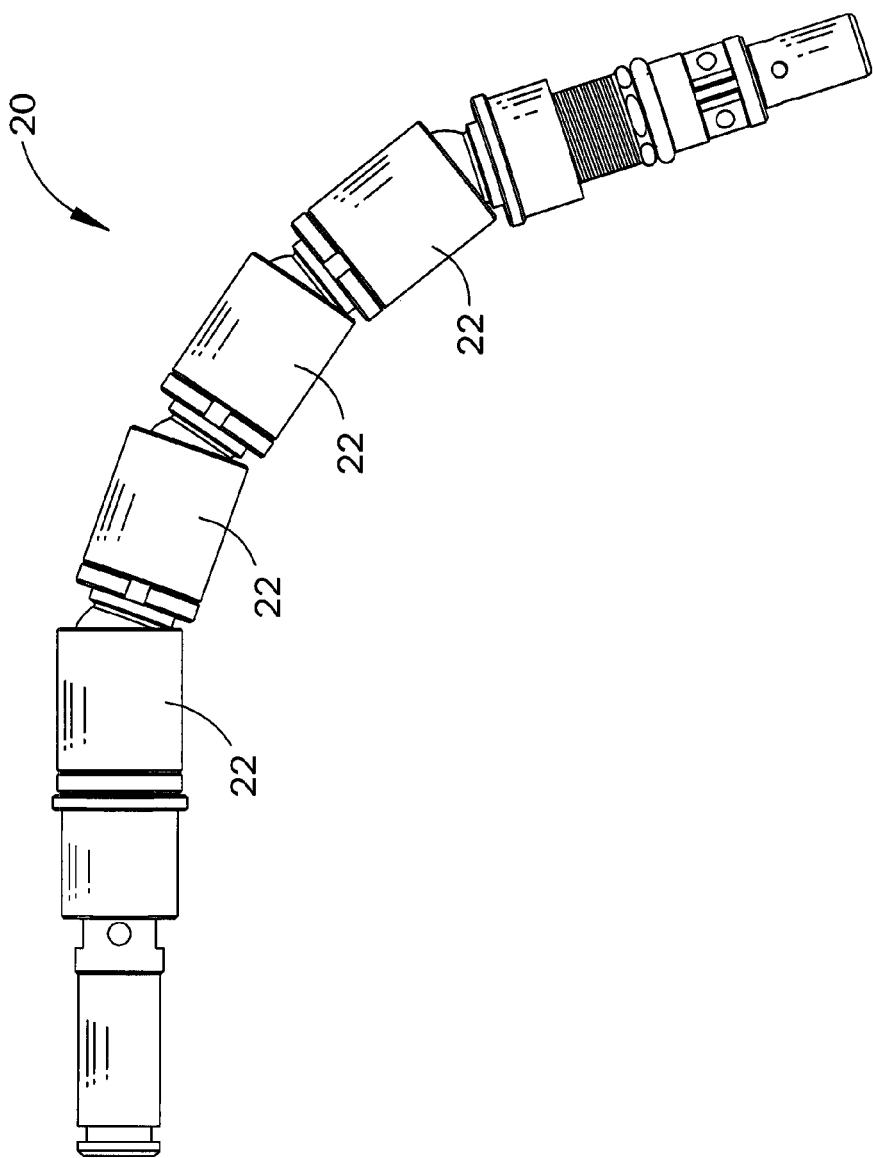
FIG. 14 is a side view of the flexible conductor tube with the flex joints rotated down to change the position or bend of the flexible conductor tube in accordance with the teachings of the present disclosure.
Figure 15:
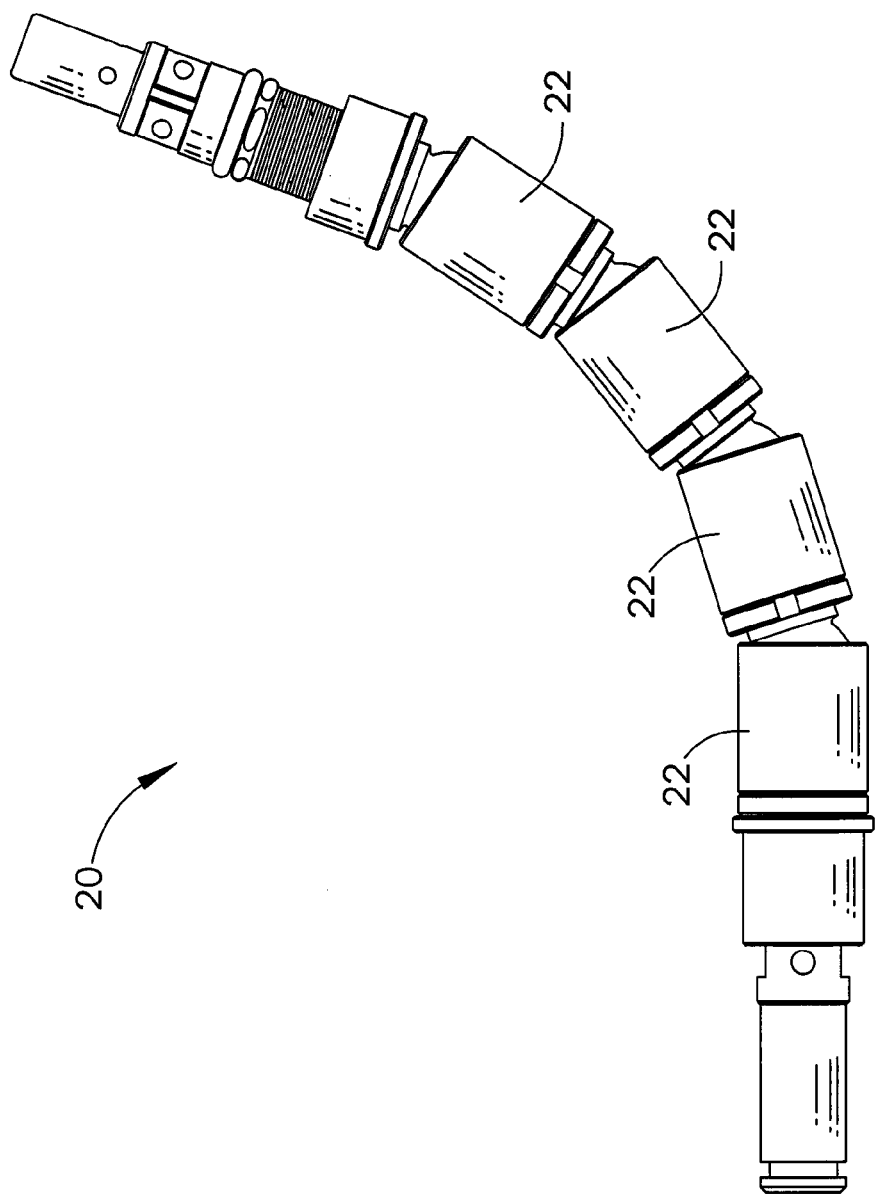
FIG. 15 is a side view of the flexible conductor tube with the flex joints rotated up to change the position or bend of the flexible conductor tube in accordance with the teachings of the present disclosure.
Figure 16:
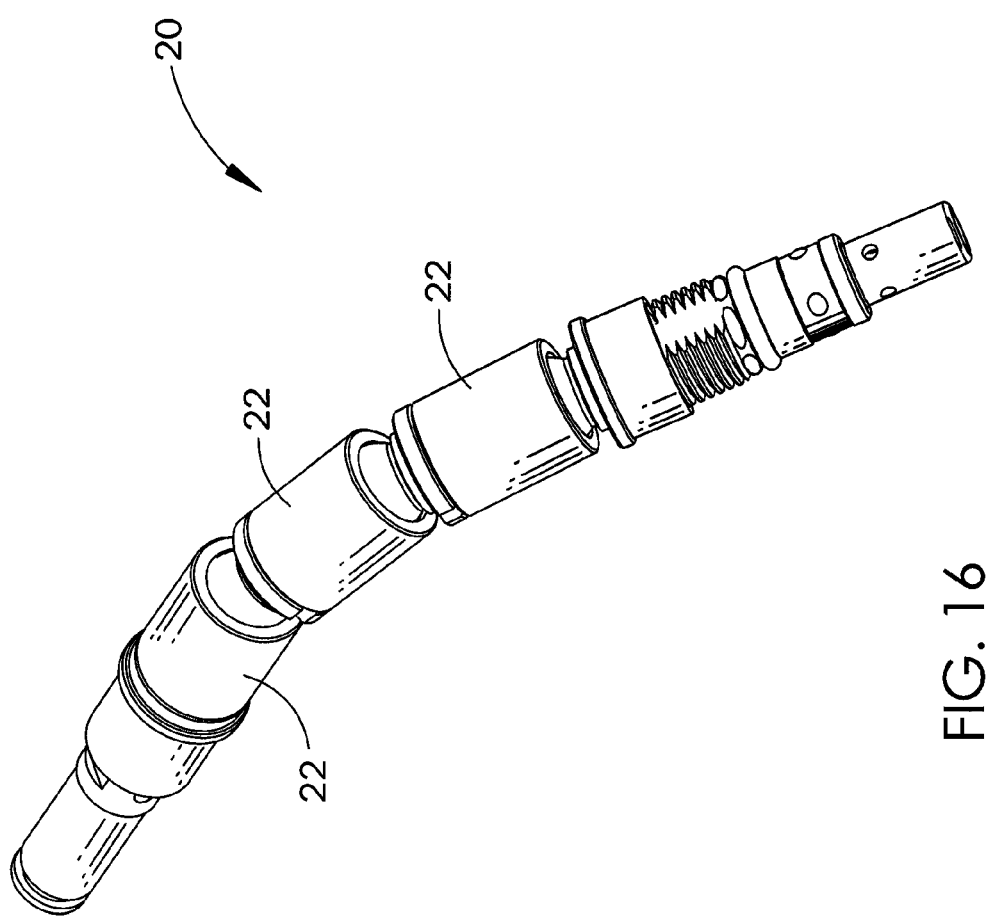
FIG. 16 is a perspective view of the flexible conductor tube with three (3) flex joints rotated down to change the position or bend of the flexible conductor tube in accordance with the teachings of the present disclosure.

Referring now to FIGS. 12-15, the flex joints 22 are illustrated in a rotated condition, both rotated down (FIGS. 12, 14) and rotated up (FIGS. 13, 15). Although not shown, the flex joints 22 may also be rotated to the side or to any other appropriate angle that an operator desires in order to reach a welding area. Additionally, the flex joints 22 may be rotated at different angles relative to one another to define an overall shape that is not necessarily a constant curve as illustrated herein (FIG. 18). With the use of more or less than the four (4) flex joints 22 illustrated, different lengths may also be achieved, such as through the use of three (3) flex joints 22 as illustrated in FIGS. 16-17. In addition to the number of flex joints 22, the size of the flex joints 22 may also be adjusted to accommodate various welding needs. As such, the specific number and size of flex joints 22 as illustrated and described herein should not be construed as limiting the scope of the present disclosure.

It should also be understood that the specific configuration of flex joints 22 as illustrated and described herein should not be limiting of the present disclosure. For example, the conductor tube 20 may employ a plurality of thermally and electrically conductive elements secured to each other and extending along a length of the conductor tube 20, wherein the elements are independently repositionable relative to each other. As such, the independently repositionable elements may comprise a configuration that deviates from the exemplary flex joints 22 as illustrated and described herein. Such independently repositionable elements that are secured to each other along the length of the conductor tube are to be construed as being within the scope of the present disclosure.

The present disclosure is merely exemplary in nature and, thus, variations that do not depart from the gist of the disclosure are intended to be within the scope of the present disclosure. For example, the flex joints 22 are preferably employed within a MIG welding gun, however, the flex joints 22 may also be employed in other types of welding guns, torches, or other industrial devices that desire flexible yet robust repositioning. Such variations are not to be regarded as a departure from the spirit and scope of the present disclosure.

What is claimed is:

1. A conductor tube for use in a welding gun comprising:
a plurality of flex joints, each flex joint of the plurality of flex joints disposed adjacent one another and placed between a welding gun handle element and a diffuser element, said each flex joint of the plurality of flex joints comprising:
   a body defining a proximal end portion and a distal end portion;
   an extension rotatably secured within the distal end portion of the body, the extension defining a head portion, the extension having an extension attachment element having an outside diameter smaller than that of the head portion;
   a cup disposed proximate the extension and being a separate element from the body and mounted within the body, the cup defining a concave inner surface engaged with the head portion of the extension, the cup including an annular flange;
   at least one spring element surrounding the annular flange of the cup; and
   a cap releasably secured to the proximal end portion of the body and engaged with the at least one spring element, the cap having a cap attachment element,
wherein the extension attachment element of the extension is attached to the cap attachment element of the cap of an adjacent one of the each flex joints of the plurality of flex joints, the extension being attached to the diffuser element, and the body attached to the welding gun handle element.

2. The conductor tube according to claim 1, wherein the body defines internal threads extending along the proximal end portion of the body for engagement with the cap and the welding gun handle element.

3. The conductor tube according to claim 2, wherein the cap further comprises external threads that engage the internal threads of the body.

4. The conductor tube according to claim 1, wherein the body further comprises an internal lip disposed around the distal end portion of the body, and the head portion of the extension engages the internal lip.

5. The conductor tube according to claim 1, wherein the extension further comprises a distal projection bearing the extension attachment element.

6. The conductor tube according to claim 5, wherein the extension further comprises a collar disposed between the head portion and the distal projection, and the collar is engaged with the cap of the adjacent one of the each flex joints of the plurality of flex joints and the diffuser element.

7. The conductor tube according to claim 5, wherein the distal extension further comprises a keyed internal bore for receiving a tool to facilitate tightening the extension to the adjacent one of the each flex joints of the plurality of flex joints.

8. The conductor tube according to claim 1, wherein the cup further comprises a collar, the flange extending from the collar, and the at least one spring element abuts the collar.

9. The conductor tube according to claim 1 wherein the at least one spring element comprises two spring elements.

10. The conductor tube according to claim 1, wherein the cap further comprises a cap annular flange abutting the body.

11. The conductor tube according to claim 10, wherein the cap annular flange further comprises radially opposed recesses for receiving a tool to facilitate tightening the cap to the body.

12. The conductor tube according to claim 1, wherein the cap further comprises a distal face engaging the at least one spring element.

13. The conductor tube according to claim 1 further comprising a jacket disposed around the plurality of flex joints.

14. The conductor tube according to claim 13 further comprising collars crimped around the jacket to secure the jacket to the conductor tube and adjacent components of the welding torch.

15. The conductor tube according to claim 1 further comprising a welding gun handle element in the form of an adapter that is attached to one of the each flex joints of the plurality of flex joints at one end and attached to a welding gun handle at another end.

16. The conductor tube according to claim 1 further comprising a diffuser end element that is attached to one of the each flex joints of the plurality of flex joints at one end and attached to a diffuser at another end.

17. A conductor tube for use in a welding gun comprising at least one first flex joint, the at least one first flex joint comprising:
   a body defining a proximal end portion and a distal end portion;
   a first cap secured to the proximal end portion of the body; and
   a first extension within the distal end portion of the body, the first extension being repositionable within the body to vary the angle between the first extension and the first cap, the first extension defining an extension proximal end and an extension distal end,
wherein the first cap is attached to the body and has a cap attachment element that is attached to a second extension of an adjacent second flex joint, the first extension is attached to the body at the extension proximal end, and the first extension has an extension attachment element that is attached to a third cap of an adjacent third flex joint at the extension distal end and that has an outside diameter smaller than that of the extension proximal end.

18. The conductor tube according to claim 17 further comprising an adapter that is attached to the at least one first flex joint at one end and attached to a welding gun handle at another end.

19. The conductor tube according to claim 17 further comprising a diffuser end element that is attached to the at least one first flex joint at one end and attached to a diffuser at another end.

20. A flex joint comprising:
   a body defining a proximal end portion and a distal end portion, the distal end portion defining a contoured surface;
   an extension rotatably secured within the distal end portion of the body, the extension defining a head portion;
   a cup disposed proximate the extension and being a separate element from the body and mounted within the body, the cup defining a concave inner surface engaged with the head portion of the extension, the cup including an annular flange;
   at least one spring element surrounding the annular flange of the cup; and
   a cap releasably secured to the proximal end portion of the body and engaged with the at least one spring element,
wherein the head portion has a surface that matches the contoured surface of the distal end portion of the body and an inner surface of the cup.

21. The conductor tube of claim 1, wherein the conductor tube is bent in multiple directions along the length of the conductor tube.

22. The conductor tube of claim 21, wherein the conductor tube is bent in a multitude of directions along different curves along the length of the conductor tube.

23. The conductor tube of claim 1, wherein the flex joints of the plurality of flex joints may be rotated relative to one another to define an overall shape that is not necessarily a constant curve.

24. The conductor tube of claim 17, wherein the cap attachment element includes cap threads and the extension attachment element includes extension threads, the cap and extension threads being screwed together.

25. The conductor tube of claim 1, wherein the at least one spring element encircles the flange of the cup.

* * * * *